(12) United States Patent
Pan et al.

(10) Patent No.: US 11,447,845 B2
(45) Date of Patent: Sep. 20, 2022

(54) METHOD FOR ENRICHING PRECIOUS METALS FROM PRINTED CIRCUIT BOARD INCINERATION ASH FROM MOLTEN POOL BY CIRCULATING CHLORINATION

(71) Applicant: Beijing University of Technology, Beijing (CN)

(72) Inventors: Dean Pan, Beijing (CN); Yufeng Wu, Beijing (CN); Bin Li, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 645 days.

(21) Appl. No.: 16/342,531

(22) PCT Filed: Dec. 21, 2018

(86) PCT No.: PCT/CN2018/122614
§ 371 (c)(1),
(2) Date: Apr. 17, 2019

(87) PCT Pub. No.: WO2019/128863
PCT Pub. Date: Jul. 4, 2019

(65) Prior Publication Data
US 2021/0324496 A1    Oct. 21, 2021

(30) Foreign Application Priority Data

Dec. 30, 2017  (CN) .......................... 201711492982.0

(51) Int. Cl.
*C22B 1/08*   (2006.01)
*C22B 11/06*  (2006.01)
(Continued)

(52) U.S. Cl.
CPC .............. *C22B 11/046* (2013.01); *C22B 1/08* (2013.01); *C22B 7/007* (2013.01); *C22B 7/008* (2013.01);
(Continued)

(58) Field of Classification Search
CPC ......... B07B 13/00; C22B 11/02; C22B 7/004; C22B 1/00; C22B 1/005; C22B 1/02;
(Continued)

(56) References Cited

U.S. PATENT DOCUMENTS 5,683,040 A    11/1997  Jakob et al.
2010/0314242 A1*  12/2010  Lee .......................... C22B 3/065
                                                    204/157.15

FOREIGN PATENT DOCUMENTS

CN           1786222 A       6/2006
CN         104328281 A       2/2015
(Continued)

*Primary Examiner* — Vanessa T. Luk
*Assistant Examiner* — Nikolas Takuya Pullen
(74) *Attorney, Agent, or Firm* — Leonid Kisselev (57) ABSTRACT

The invention relates to the field of comprehensive recovery of valuable elements such as bromine, base metal and precious metal from incineration ash, especially relates to a method for enriching precious metals from printed circuit board incineration ash by bath smelting-chlorination circulation process. The process mainly comprises pretreatment of the printed circuit board Incineration ash and circulation-chlorination enrichment process for precious metals. The crude copper, crude zinc sulfate, bromine, lead chloride and precious metal enriched slag are obtained. Compared with the traditional process, it realizes the cycle enrichment of precious metals as well as avoids the loss of valuable metals and secondary pollution caused by tail liquid discharge.

6 Claims, 2 Drawing Sheets

(51) Int. Cl.
   *C22B 15/00*   (2006.01)
   *C22B 7/02*    (2006.01)
   *C22B 11/00*   (2006.01)
   *C22B 7/00*    (2006.01)

(52) U.S. Cl.
   CPC .............. *C22B 7/02* (2013.01); *C22B 11/044* (2013.01); *C22B 11/06* (2013.01); *C22B 15/0082* (2013.01)

(58) Field of Classification Search
   CPC .. C22B 1/248; C22B 5/00; C22B 5/02; C22B 5/12; C22B 5/14; C22B 5/16; C22B 5/18; C22B 19/30; C22B 21/0007; C22B 21/0069; C22B 21/0092; C22B 34/12; C22B 34/1204; C22B 34/1218; C22B 3/04; C22B 3/08; C22B 11/00; C22B 11/044; C22B 11/04; C22B 11/042; C22B 11/046; C22B 11/06; C22B 15/00; C22B 15/0008; C22B 15/0065; C22B 15/00082; C22B 1/04; C22B 1/06; C22B 1/08; C22B 1/10; C22B 3/045; C22B 3/06; C22B 3/065; C22B 3/10; C22B 3/12; C22B 3/14; C22B 7/006; C22B 7/007; C22B 7/008; C22B 11/048; C22B 13/04; C22B 13/045; C22B 15/0002; C22B 15/0004; C22B 15/0006; C22B 15/001; C22B 15/0013; C22B 15/0015; C22B 15/0017; C22B 15/0019; C22B 15/0021; C22B 15/0023; C22B 19/20; C22B 19/22; C22B 19/24; C22B 19/26; C22B 61/00; C22B 3/00; H05K 2203/178
   See application file for complete search history.

(56) References Cited

FOREIGN PATENT DOCUMENTS

| | | | |
|---|---|---|---|
| CN | 104745824 A | 7/2015 | |
| CN | 106086415 A | 11/2016 | |
| WO | WO-2015193901 A1 * | 12/2015 | ........... C01G 55/005 |

* cited by examiner

METHOD FOR ENRICHING PRECIOUS METALS FROM PRINTED CIRCUIT BOARD INCINERATION ASH FROM MOLTEN POOL BY CIRCULATING CHLORINATION

CROSS REFERENCE TO RELATED APPLICATION

This application is a national stage application of International application number PCT/CN2018/122614, filed Dec. 21, 2018, titled "A Method for Enrichment of Precious Metals from Printed Circuit Board Incineration Ash from Molten Pool by Circulation Chlorination" which claims the priority benefit of Chinese Patent Application No. 201711492982.0, filed on Dec. 30, 2017, which is hereby incorporated by reference in its entirety.

TECHNICAL FIELD

The invention relates to the field of comprehensive recovery of valuable elements such as bromine, base metal and precious metal from ash, especially relates to a method for enriching precious metals from printed circuit board (PCB) incineration ash in molten pool by circulating chlorination.

BACKGROUND

The total amount of electronic products and the amount entering into scrapping every year are huge and growing fast. Because scrapped electronic products contain many toxic and harmful substances, they have become a main source of pollution. In the same time, scrapped electronic products are rich in precious metals and other valuable materials with a grade often much higher than that of primary ore such as gold, silver, palladium and copper. Therefore, scrapped electronic products have become an important source of strategic materials, a "urban mineral" that countries are competing to mine. Traditional technology of recycling scrapped electronic products is backward, resulting in low recovery rate, which causes all-round damage to soil, water, atmosphere and human health.

Among all scrapped electronic products, waste printed circuit boards is the most difficult to treat and causes the most amount pollution. There are environmental risks in the traditional recycling process because waste printed circuit boards contain heavy metals such as lead, brominated flame retardants and other harmful substances. In order to avoid dioxin and other secondary pollution and achieve an environment-friendly disposal, demonstration lines have been set up to dispose the circuit board directly by pyrolysis in molten pool under the high temperature for decomposition using self-heating smelting and collaborative smelting processes. Due to the presence of a large number of brominated flame retardants in the circuit boards, a large amount of brominated smelting ash or incineration ash will be produced in the smelting process. The ash contains a large amount of Cu, Zn, Pb, Sn, and other valuable elements, such as Br, precious metals, such as Ag, that are will be valuable to recover. The following table shows the XRF test results of a batch of circuit board incineration ash in molten pool.

| Element | Ni | Cu | Zn | As | Br | Ag | Sn | Pb | Sb | Bi |
|---|---|---|---|---|---|---|---|---|---|---|
| content (%) | 0.05 | 20.5 | 15.4 | 1.1 | 24.9 | 0.3 | 4.1 | 8.6 | 0.6 | 0.11 |

| Element | O | F | Al | Si | P | S | Cl | Fe | Ca | Cd |
|---|---|---|---|---|---|---|---|---|---|---|
| Content (%) | 12.5 | 0.3 | 1.7 | 1 | 0.1 | 1.1 | 6.2 | 0.9 | 0.1 | 0.53 |

The main elements in the ash are bromine, copper, zinc, lead, chloride, tin and oxygen, the corresponding phases are halides and oxides, mainly contains $CuBr$, $CuCl$, $Pb(Br/Cl)$, $ZnO$ and $SnO_2$.

At present, there is no comprehensive recovery process of copper recovery from ash that is focused on PCB incineration ash. The existing processes are as follows:

(1) Pyrogenic Treatment

This method is mainly used in rotary kiln, reverberatory furnace and arc furnace, In general, volatile lead and zinc are volatilized and enriched under a reducing atmosphere, while other elements are reduced into copper ingots or lead ingots and returned to the smelting process. Returning to smelting not only reduces the treating capacity of raw materials in copper smelting but also increases the content of impurities in raw materials and reduces the capacity of furnace, moreover, the cycling accumulation of impurities such as Zn and As will directly affect the quality of the final electro-copper product.

There are some problems in the pyrogenic treatment method of copper recovery from ash, such as poor working conditions and low comprehensive recovery rate of valuable metals. At present, only small copper smelting enterprises use this method for simple recovery of ash. This method is gradually phased out under the increasingly environmental pressure.

(2) Semi-Wet Treatment

Semi-wet treatment of copper smelting ash is a combination of pyrogenic and wet process. It is also one of the main processes of copper smelting ash treatment. The major components of this method Includes the following:

Rotary kiln reduction and roasting-leaching process: in the rotary kiln reduction and roasting process, most of Zn, Pb and Cd can be volatilized and enriched into the secondary ash; Rotary kiln slag is sent to the corresponding copper process for copper recovery. This method reduces the load of pyrogenic process, reduces the accumulation effect of impurity ions such as Zn, Pb, and plays a positive role in improving the quality of electro-copper products. However, this method has the drawback of lacking secondary ash disposal and valuable metals cannot be completely recovered.

Sulfation roasting—leaching process: this process is mainly aimed at the recovery of As in ash. In the process of sulfation roasting, As can be volatilized in the form of $As_2O_3$ and then collected and recovered by the flue gas of rotary kiln. Cu and Zn are recovered by subsequent sulfuric acid leaching.

(3) Wet Treatment

The representative process for this method is the leaching-ammonium carbonate conversion method, which mainly aims at the recovery of lead. Copper smelting ash is first leached to produce zinc sulphate heptahydrate, the lead-rich leaching slag is subjected to a series of processes including conversion by ammonium carbonate, dissolution in nitric acid or silicic acid, and lead sulphate precipitation to obtain a first-grade product of tribasic lead sulfate. The method has the advantages of low pollution and low energy consumption.

In addition to the above method, the total wet method also includes the alkali leaching method, pressure leaching-extraction process, ash leaching—alkali leaching of washed slag Pb/Bi process, soot leaching—water washing slag alkali leaching Pb/Bi process, soot leaching, and water washing slag acid leaching b/Bi process.

Due to the high content of copper, zinc, lead and bromine in PCB incineration ash, bromine and copper mainly exist in the form of double salt. The present invention adopts sulfation stepwise roasting treatment technique, controls the first roasting temperature from 200° C. to 270° C., wherein the halogen elements in the ash are volatilized, absorbed and separated by alkali liquid, and controls the second roasting temperature from 400° C. to 550° C., Cu, to convert Zn and other valuable metals into soluble sulfates and to separate. Subsequently the circulating enrichment of precious metals are realized by the combined process of chlorination and lead powder displacement. The process can achieve the comprehensive recovery of valuable metals, recycle tail liquid at the same time, eliminate secondary wastewater, and have significant environmental and economic benefits.

SUMMARY

The purpose of the invention is to solve the pretreatment and recovery of base metals such as Cu, Zn, Pb and other valuable elements such as bromine, and the circulation enrichment of precious metals from PCB molten pool incineration ash. The method has the advantages of high additional value recovery and non-tail liquid discharge.

A method for enriching precious metals from printed circuit board incineration ash by bath smelting circulating-chlorination process, comprising the following steps:

(1) Pretreatment of printed circuit board incineration ash, including slurry aging, primary roasting, secondary roasting, water leaching and enrichment, displacement and precipitation of copper, neutralization of precipitated zinc, and comprehensive treatment of primary and secondary flue gas; the printed circuit board incineration ash and concentrated sulfuric acid of 98% (weight by weight) concentration are mixed for slurry aging, the mass ratio between the printed circuit board incineration ash and the 98% concentrated sulfuric acid is 0.5:1-1.5:1, a slurry is obtained after aging for 12-24 hours; the slurry is roasted to get primary roasted sand and a primary roasted smoke; the primary roasted sand is roasted again to obtain a secondary roasted sand and a secondary roasted smoke; the secondary roasted sand is enriched by water leaching and enrichment to generate a water leaching slag rich in precious metals, and a water leaching solution; zinc powder is added into the water leaching solution to displace copper in the water leaching solution to obtain precipitated crude copper and a post copper precipitation solution, the molar ratio of zinc powder to copper in the water leaching solution is 1.2:1-1.5:1; the post copper precipitation solution is vaporized to precipitated zinc to generate crude zinc sulfate crystalline and post zinc precipitation solution. The post zinc precipitation solution is returned to the water leaching solution for water leaching and enrichment; the primary roasted smoke from primary roasting is sprayed with sodium hydroxide solution with a mass percentage of 30% to generate alkali washing solution and a flue gas, empty the flue gas; the alkali washing solution is filtrated to generate alkali washing filtrate and alkali washing residue, the alkali washing residue is returned to a subsequent cycle of chlorination enrichment process as chlorination raw material; a bromine salt and a post bromine precipitation solution are obtained through partial evaporation of the alkali washing filtrate, the process post bromine precipitation solution is returned to alkali washing to serve as part of the alkali solution for spraying the primary roasted smoke; dust collection and desulfurization of the secondary roasted smoke is performed to obtain dust ash and a flue gas, empty the flue gas, the dust ash is returned to the subsequent cycle of chlorination enrichment process as chlorination raw material;

(2) Circulating chlorination enrichment process for precious metals: the method includes chlorination filtration, displacement enrichment and cold precipitation of lead; the chlorination raw materials obtained from the step (1) are used for chlorination and filtration to obtain chlorination slag and chlorination solution; the chlorination raw materials include the water leaching slag, the alkali washing residue and the dust ash; the chlorination slag is collected for centralized processing later; the chlorination solution undergoes displacement and enrichment to obtain a precious metal slag and a precious metal lean solution; the precious metal slag is rich in precious metal and used to extract the precious metal; precious metal lean solution is cooled to room temperature and filtered to generate lead chloride and lead lean solution, the lead lean solution is returned to the chlorination filtration process as source of the chlorination solution;

Preferably, in the step (1), during primary roasting process, the roasting temperature is 200-270° C. and the roasting time is 1-3 hours. During secondary roasting process, the roasting temperature is 400-550° C. and the roasting time is 0.5-2 hours; Primary roasting and secondary roasting are carried out in the same (i.e., continuous) roasting process. Tap water is used as the water leaching solution in the process of water leaching, and lead powder is added, the ratio between water and secondary roasted sand is 3:1-5:1 (Liter:Kilogram); the ratio between water and lead powder is 1:3-1:10 (Liter:Gram); the leaching temperature is 45-65° C., and the leaching time is 1-2 hours.

Preferably, in the Step (2) of the chlorination filtration process of cycle chlorination enrichment process of precious metal, calcium chloride, sodium chloride and 30% hydrochloric acid are used as chlorination solution, the concentration of calcium chloride in the chlorination solution is 50-100 g/L, the concentration of sodium chloride in the chlorination solution is 200-300 g/L, the concentration of 30% hydrochloric acid in the chlorination solution is 200-400 g/L, the ratio between chlorination solution and chlorination raw material (the water leaching slag, the alkali washing residue and the dust ash) is 3:1-10:1 Liter:Kilogram, chlorination temperature is 65-95° C., and the chlorination time is 1-4 hours; during the chlorination process, 35-80 g sodium chlorate is added per liter of leaching solution. In the displacement enrichment process, lead powder is used for displacement, the ratio between the chlorination solution and the lead powder is 5:1-20:1 (Liter:gram), displacement temperature is 65-85° C., and the displacement time is 0.5-2 hours.

In the Step (1) of pretreatment process of printed circuit board incineration ash: halogen elements enter into the flue gas by low-temperature roasting through sulfation, and were captured and recovered. Valuable elements such as copper and zinc were recovered by means of secondary roasting, water leaching, displacement, evaporation, and crystallization to obtain precipitated crude copper and crude zinc sulfate, post zinc precipitation solution was returned to water leaching and enrichment step for leaching and enrichment. The recycle of the tail liquid is realized to avoid the disposal of the tail liquid and the loss of valuable metals such as copper and zinc. At the same time, precious metal slag and lead chloride are obtained by chlorination and lead displacement in the process of cyclic chlorination enrichment of precious metal slag, the lead tailing liquid is recycled and utilized to avoid the pollution and the loss of precious metals while at the same time cycle enrichment of precious metals is realized. Compared with the traditional technology, the invention realizes the circulating enrichment of precious metals and avoids the loss of valuable metals and secondary pollution caused by the discharge of tail liquid.

DETAILED DESCRIPTION OF THE PREFERRED EMBODIMENTS

Embodiment I

Figure 1:
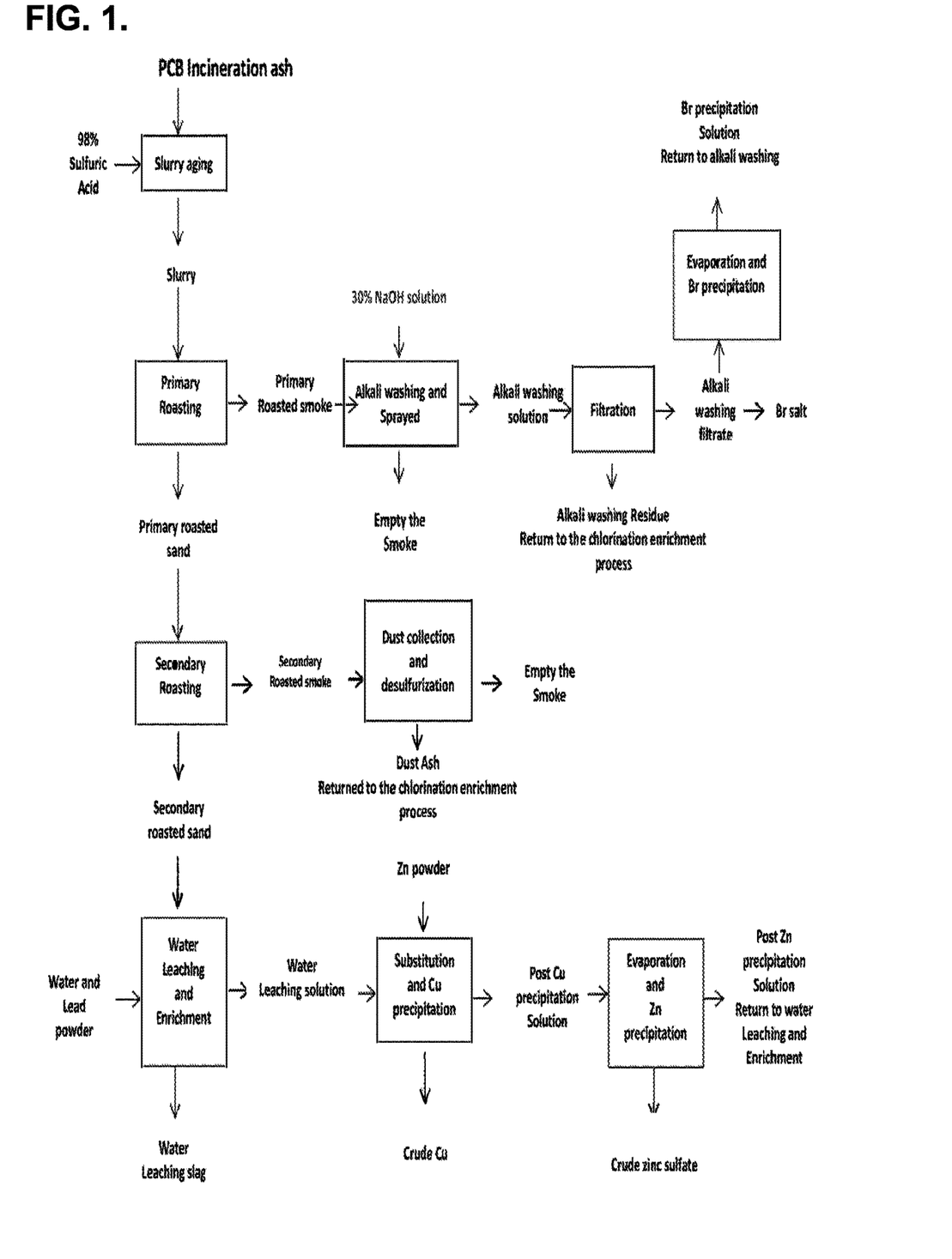
FIG. 1 shows a flow chart of pretreatment process for the printed circuit board incineration ash.
Figure 2:
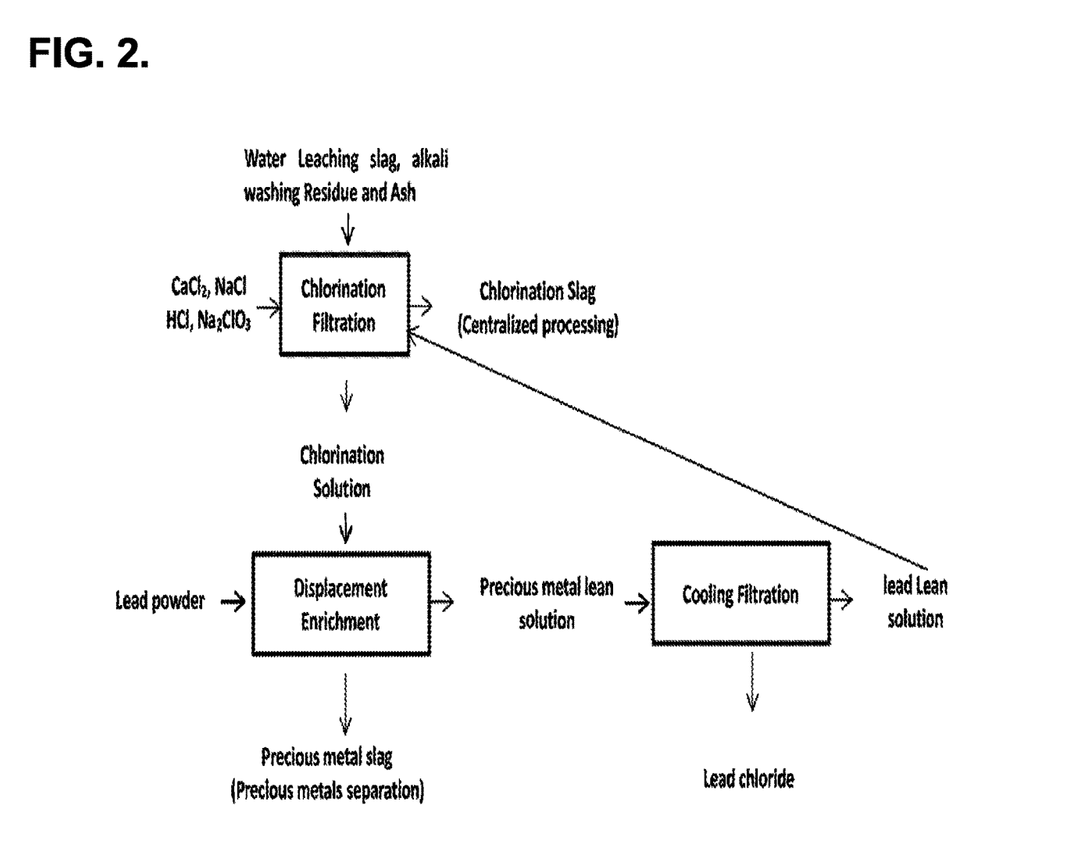
FIG. 2 shows a flow chart of circulating-chlorination enrichment and recovery of precious metals.

Enrichment and recovery were performed according of the following steps:

The enrichment and recovery steps are as follows:

Mix the printed circuit board incineration ash and concentrated sulfuric acid with a mass concentration of 98% for slurry aging, the mass ratio between the printed circuit board incineration ash and the 98% concentrated sulfuric acid was 0.5:1, slurry was obtained after aging for 12 hours. The slurry was roasted at 200° C. and 1 hour to get primary roasted sand and primary roasted smoke. Secondary roasted sand and secondary roasted smoke were obtained through secondary roasting of the primary roasted sand, the roasting temperature was 400° C. and roasting time was 0.5 hours. Primary roasting and secondary roasting were carried out in the same (i.e., continuous) roasting process. The secondary roasted sand was enriched by water leaching enrichment to get a water leaching slag rich in precious metals and a water leaching solution. Tap water was used as leaching solution in the process of water leaching, and lead powder was added to the water. The ratio between water and the secondary roasted sand was 3:1 (Liter:Kilogram), the ratio between the water and the lead powder is 1:3 (Liter:Gram), the leaching temperature was 45° C., and the leaching time was 1 hour. Zinc powder was used to displace copper in the leaching solution to obtain precipitated crude copper and post copper precipitation solution, the molar ratio of the zinc powder to copper in the leaching solution was 1.2:1. Evaporate the post copper precipitation solution to precipitate the zinc to get crude zinc sulfate crystalline and post zinc precipitation solution, the post zinc precipitation solution was returned to the water leaching process as part of the leaching solution. The primary roasted smoke from primary roasting was sprayed with sodium hydroxide solution with a mass percentage of 30% to get alkali washing solution and a flue gas, the flue gas was emptied into atmosphere. Alkali washing filtrate and alkali washing residue were obtained by filtration of the alkali washing solution, the alkali washing residue was returned to the subsequent cycle of chlorination enrichment process as part of chlorination raw materials. A bromine salt and a post bromine precipitation solution were obtained through partial evaporation of the alkali washing filtrate, the post bromine precipitation solution was returned to alkali washing/spraying. Perform dust collection and desulfurization on the secondary roasted smoke to obtain dust ash and a flue gas, empty the flue gas into the atmosphere, the dust ash was returned to the subsequent cycle of chlorination enrichment process as part of chlorination raw materials. Chlorination slag and chlorination solution were obtained by chlorination filtration of the chlorination raw materials that include the water leaching slag, the alkali washing residue and the dust ash. The chlorination slag was collected and combined for centralized processing, a mixture of calcium chloride, sodium chloride and 30% hydrochloric acid were used as chlorination solution, the concentration of calcium chloride in the chlorination solution was 50 g/L, the concentration of sodium chloride in the chlorination solution was 200 g/L, the concentration of 30% hydrochloric acid in the chlorination solution was 200 g/L, the ratio between chlorination solution and chlorination raw material (the water leaching slag, the alkali washing residue and the dust ash) was 3:1 (Liter:Kilogram), chlorination temperature was 65° C., and the chlorination time was 1 hour; during the chlorination process, 35 g sodium chlorate is added per liter of the leaching solution. Precious metal slag and precious metal lean solution were obtained by displacement enrichment of the chlorination solution; the precious metal slag was rich in precious metal was used to separate/extract the precious metal; in the displacement enrichment process, lead powder was used for displacement, the ratio between the chlorination solution and the lead powder was 5:1 (Liter:gram), displacement temperature was 65° C., and the displacement time was 0.5 hour. The precious metal lean solution was cooled to room temperature and filtered to get lead chloride and lead lean solution, the lead lean solution was returned to the chlorination filtration process as part of the chlorination solution.

The recovery rate of bromine was 98.7%, the recovery rate of copper was 99.2%, the recovery rate of lead was 99.1%, the recovery rate of zinc was 98.9% and the recovery rate of precious metal was 99.2%.

Embodiment 2

Enrichment and recovery were performed according of the following steps:

The enrichment and recovery steps are as follows:

Mix the printed circuit board incineration ash and concentrated sulfuric acid with a mass concentration of 98% for slurry aging, the mass ratio between the printed circuit board incineration ash and the 98% concentrated sulfuric acid was 1.5:1, slurry was obtained after aging for 24 hours. The slurry was roasted at 270° C. and 3 hours to get primary roasted sand and primary roasted smoke. Secondary roasted sand and secondary roasted smoke were obtained through secondary roasting of the primary roasted sand, the roasting temperature was 550° C. and roasting time was 2 hours. Primary roasting and secondary roasting were carried out in the same roasting process. The secondary roasted sand was enriched by water leaching enrichment to get a water leaching slag rich in precious metals and a water leaching solution. Tap water was used as leaching solution in the process of water leaching, and lead powder was added to the water. The ratio between water and the secondary roasted sand was 5:1 (Liter:Kilogram), the ratio between the water and the lead powder is 1:10 (Liter:Gram), the leaching temperature was 65° C., and the leaching time was 2 hours. Zinc powder was used to displace copper in the leaching solution to obtain precipitated crude copper and post copper precipitation solution, the molar ratio of the zinc powder to copper in the leaching solution was 1.5:1. Evaporate the post copper precipitation solution to precipitate the zinc to get crude zinc sulfate crystalline and post zinc precipitation solution, the post zinc precipitation solution was returned to the water leaching process as part of the leaching solution. The primary roasted smoke from primary roasting was sprayed with sodium hydroxide solution with a mass percentage of 30% to get alkali washing solution and a flue gas, the flue gas was emptied into atmosphere. Alkali washing filtrate and alkali washing residue were obtained by filtration of the alkali washing solution, the alkali washing residue was returned to the subsequent cycle of chlorination enrichment process as part of chlorination raw materials. A bromine salt and a post bromine precipitation solution were obtained through partial evaporation of the alkali washing filtrate, the post bromine precipitation solution was returned to alkali washing/spraying. Perform dust collection and desulfurization on the secondary roasted smoke to obtain dust ash and a flue gas, empty the flue gas into the atmosphere, the dust ash was returned to the subsequent cycle of chlorination enrichment process as part of chlorination raw materials. Chlorination slag and chlorination solution were obtained by chlorination filtration of the chlorination raw materials that include the water leaching slag, the alkali washing residue and the dust ash. The Chlorination slag was collected and combined for centralized processing, a mixture of calcium chloride, sodium chloride and 30% hydrochloric acid were used as chlorination solution, the concentration of calcium chloride in the chlorination solution was 100 g/L, the concentration of sodium chloride in the chlorination solution was 300 g/L, the concentration of 30% hydrochloric acid in the chlorination solution was 400 g/L, the ratio between chlorination solution and chlorination raw material (the water leaching slag, the alkali washing residue and the dust ash) was 3:1 (Liter:Kilogram), chlorination temperature was 95° C., and the chlorination time was 4 hours; during the chlorination process, 80 g sodium chlorate is added per liter of the leaching solution. Precious metal slag and precious metal lean solution were obtained by displacement enrichment of the chlorination solution; the precious metal slag was rich in precious metal was used to separate/extract the precious metal; in the displacement enrichment process, lead powder was used for displacement, the ratio between the chlorination solution and the lead powder was 10:1 (Liter:gram), displacement temperature was 85° C., and the displacement time was 2 hours. The precious metal lean solution was cooled to room temperature and filtered to get lead chloride and lead lean solution, the lead lean solution was returned to the chlorination filtration process as part of the chlorination solution.

The recovery rate of bromine was 99.3%, the recovery rate of copper was 99.5%, the recovery rate of lead was 99.5%, the recovery rate of zinc was 98.9% and the recovery rate of precious metal was 99.1%.

Embodiment 3

Enrichment and recovery were performed according of the following steps:

The enrichment and recovery steps are as follows:

Mix the printed circuit board incineration ash and concentrated sulfuric acid with a mass concentration of 98% for slurry aging, the mass ratio between the printed circuit board incineration ash and the 98% concentrated sulfuric acid was 0.5:1, slurry was obtained after aging for 24 hours. The slurry was roasted at 200° C. and 3 hours to get primary roasted sand and primary roasted smoke. Secondary roasted sand and secondary roasted smoke were obtained through secondary roasting of the primary roasted sand, the roasting temperature was 400° C. and roasting time was 2 hours. Primary roasting and secondary roasting were carried out in the same roasting process. The secondary roasted sand was enriched by water leaching enrichment to get a water leaching slag rich in precious metals and a water leaching solution. Tap water was used as leaching solution in the process of water leaching, and lead powder was added to the water. The ratio between water and the secondary roasted sand was 3:1 (Liter:Kilogram), the ratio between the water and the lead powder is 1:10 (Liter:Gram), the leaching temperature was 45° C., and the leaching time was 2 hours. Zinc powder was used to displace copper in the leaching solution to obtain precipitated crude copper and post copper precipitation solution, the molar ratio of the zinc powder to copper in the leaching solution was 1.2:1. Evaporate the post copper precipitation solution to precipitate the zinc to get crude zinc sulfate crystalline and post zinc precipitation solution, the post zinc precipitation solution was returned to the water leaching process as part of the leaching solution. The primary roasted smoke from primary roasting was sprayed with sodium hydroxide solution with a mass percentage of 30% to get alkali washing solution and a flue gas, the flue gas was emptied into atmosphere. Alkali washing filtrate and alkali washing residue were obtained by filtration of the alkali washing solution, the alkali washing residue was returned to the subsequent cycle of chlorination enrichment process as part of chlorination raw materials. A bromine salt and a post bromine precipitation solution were obtained through partial evaporation of the alkali washing filtrate, the post bromine precipitation solution was returned to alkali washing/spraying. Perform dust collection and desulfurization on the secondary roasted smoke to obtain dust ash and a flue gas, empty the flue gas into the atmosphere, the dust ash was returned to the subsequent cycle of chlorination enrichment process as part of chlorination raw materials. Chlorination slag and chlorination solution were obtained by chlorination filtration of the chlorination raw materials that include the water leaching slag, the alkali washing residue and the dust ash. The chlorination slag was collected and combined for centralized processing, a mixture of calcium chloride, sodium chloride and 30% hydrochloric acid were used as chlorination solution, the concentration of calcium chloride in the chlorination solution was 100 g/L, the concentration of sodium chloride in the chlorination solution was 200 g/L, the concentration of 30% hydrochloric acid in the chlorination solution was 400 g/L, the ratio between chlorination solution and chlorination raw material (the water leaching slag, the alkali washing residue and the dust ash) was 3:1 (Liter:Kilogram), chlorination temperature was 95° C., and the chlorination time was 1 hour; during the chlorination process, 80 g sodium chlorate is added per liter of the leaching solution. Precious metal slag and precious metal lean solution were obtained by displacement enrichment of the chlorination solution; the precious metal slag was rich in precious metal was used to separate/extract the precious metal; in the displacement enrichment process, lead powder was used for displacement, the ratio between the chlorination solution and the lead powder was 5:1 (Liter:gram), displacement temperature was 85° C., and the displacement time was 0.5 hours. The precious metal lean solution was cooled to room temperature and filtered to get lead chloride and lead lean solution, the lead lean solution was returned to the chlorination filtration process as part of the chlorination solution.

The recovery rate of bromine was 98.6%, the recovery rate of copper was 99.2%, the recovery rate of lead was 98.7%, the recovery rate of zinc was 98.8% and the recovery rate of precious metal was 98.9%.

Embodiment 4

Enrichment and recovery were performed according of the following steps:

The enrichment and recovery steps are as follows:

Mix the printed circuit board incineration ash and concentrated sulfuric acid with a mass concentration of 98% for slurry aging, the mass ratio between the printed circuit board incineration ash and the 98% concentrated sulfuric acid was 1.35:1, slurry was obtained after aging for 16 hours. The slurry was roasted at 235° C. and 1.5 hours to get primary roasted sand and primary roasted smoke. Secondary roasted sand and secondary roasted smoke were obtained through secondary roasting of the primary roasted sand, the roasting temperature was 468° C. and roasting time was 1 hour. Primary roasting and secondary roasting were carried out in the same roasting process. The secondary roasted sand was enriched by water leaching enrichment to get a water leaching slag rich in precious metals and a water leaching solution. Tap water was used as leaching solution in the process of water leaching, and lead powder was added to the water. The ratio between water and the secondary roasted sand was 3.5:1 (Liter:Kilogram), the ratio between the water and the lead powder is 1:7.5 (Liter:Gram), the leaching temperature was 50° C., and the leaching time was 1.5 hours. Zinc powder was used to displace copper in the leaching solution to obtain precipitated crude copper and post copper precipitation solution, the molar ratio of the zinc powder to copper in the leaching solution was 1.25:1. Evaporate the post copper precipitation solution to precipitate the zinc to get crude zinc sulfate crystalline and post zinc precipitation solution, the post zinc precipitation solution was returned to the water leaching process as part of the leaching solution. The primary roasted smoke from primary roasting was sprayed with sodium hydroxide solution with a mass percentage of 30% to get alkali washing solution and a flue gas, the flue gas was emptied into atmosphere. Alkali washing filtrate and alkali washing residue were obtained by filtration of the alkali washing solution, the alkali washing residue was returned to the subsequent cycle of chlorination enrichment process as part of chlorination raw materials. A bromine salt and a post bromine precipitation solution were obtained through partial evaporation of the alkali washing filtrate, the post bromine precipitation solution was returned to alkali washing/spraying. Perform dust collection and desulfurization on the secondary roasted smoke to obtain dust ash and a flue gas, empty the flue gas into the atmosphere, the dust ash was returned to the subsequent cycle of chlorination enrichment process as part of chlorination raw materials. Chlorination slag and chlorination solution were obtained by chlorination filtration of the chlorination raw materials that include the water leaching slag, the alkali washing residue and the dust ash. The chlorination slag was collected and combined for centralized processing, a mixture of calcium chloride, sodium chloride and 30% hydrochloric acid were used as chlorination solution, the concentration of calcium chloride in the chlorination solution was 68 g/L, the concentration of sodium chloride in the chlorination solution was 267 g/L, the concentration of 30% hydrochloric acid in the chlorination solution was 318 g/L, the ratio between chlorination solution and chlorination raw material (the water leaching slag, the alkali washing residue and the dust ash) was 6.5:1 (Liter:Kilogram), chlorination temperature was 78° C., and the chlorination time was 3 hours; during the chlorination process, 55 g sodium chlorate is added per liter of the leaching solution. Precious metal slag and precious metal lean solution were obtained by displacement enrichment of the chlorination solution; the precious metal slag was rich in precious metal was used to separate/extract the precious metal; in the displacement enrichment process, lead powder was used for displacement, the ratio between the chlorination solution and the lead powder was 16:1 (Liter:gram), displacement temperature was 70° C., and the displacement time was 1.5 hours. The precious metal lean solution was cooled to room temperature and filtered to get lead chloride and lead lean solution, the lead lean solution was returned to the chlorination filtration process as part of the chlorination solution.

The recovery rate of bromine was 95.1%, the recovery rate of copper was 98.3%, the recovery rate of lead was 99.2%, the recovery rate of zinc was 97.8% and the recovery rate of precious metal was 98.5%.

Embodiment 5

Enrichment and recovery were performed according of the following steps:

The enrichment and recovery steps are as follows:

Mix the printed circuit board incineration ash and concentrated sulfuric acid with a mass concentration of 98% for slurry aging, the mass ratio between the printed circuit board incineration ash and the 98% concentrated sulfuric acid was 1:1, slurry was obtained after aging for 18 hours. The slurry was roasted at 240° C. and 2 hours to get primary roasted sand and primary roasted smoke. Secondary roasted sand and secondary roasted smoke were obtained through secondary roasting of the primary roasted sand, the roasting temperature was 500° C. and roasting time was 1 hour. Primary roasting and secondary roasting were carried out in the same roasting process. The secondary roasted sand was enriched by water leaching enrichment to get a water leaching slag rich in precious metals and a water leaching solution. Tap water was used as leaching solution in the process of water leaching, and lead powder was added to the water. The ratio between water and the secondary roasted sand was 4:1 (Liter:Kilogram), the ratio between the water and the lead powder is 1:5 (Liter:Gram), the leaching temperature was 55° C., and the leaching time was 1.5 hours. Zinc powder was used to displace copper in the leaching solution to obtain precipitated crude copper and post copper precipitation solution, the molar ratio of the zinc powder to copper in the leaching solution was 1.3:1. Evaporate the post copper precipitation solution to precipitate the zinc to get crude zinc sulfate crystalline and post zinc precipitation solution, the post zinc precipitation solution was returned to the water leaching process as part of the leaching solution. The primary roasted smoke from primary roasting was sprayed with sodium hydroxide solution with a mass percentage of 30% to get alkali washing solution and a flue gas, the flue gas was emptied into atmosphere. Alkali washing filtrate and alkali washing residue were obtained by filtration of the alkali washing solution, the alkali washing residue was returned to the subsequent cycle of chlorination enrichment process as part of chlorination raw materials. A bromine salt and a post bromine precipitation solution were obtained through partial evaporation of the alkali washing filtrate, the post bromine precipitation solution was returned to alkali washing/spraying. Perform dust collection and desulfurization on the secondary roasted smoke to obtain dust ash and a flue gas, empty the flue gas into the atmosphere, the dust ash was returned to the subsequent cycle of chlorination enrichment process as part of chlorination raw materials. Chlorination slag and chlorination solution were obtained by chlorination filtration of the chlorination raw materials that include the water leaching slag, the alkali washing residue and the dust ash. The chlorination slag was collected and combined for centralized processing, a mixture of calcium chloride, sodium chloride and 30% hydrochloric acid were used as chlorination solution, the concentration of calcium chloride in the chlorination solution was 80 g/L, the concentration of sodium chloride in the chlorination solution was 250 g/L, the concentration of 30% hydrochloric acid in the chlorination solution was 300 g/L, the ratio between chlorination solution and chlorination raw material (the water leaching slag, the alkali washing residue and the dust ash) was 7:1 (Liter:Kilogram), chlorination temperature was 85° C., and the chlorination time was 2 hours; during the chlorination process, 60 g sodium chlorate is added per liter of the leaching solution. Precious metal slag and precious metal lean solution were obtained by displacement enrichment of the chlorination solution; the precious metal slag was rich in precious metal was used to separate/extract the precious metal; in the displacement enrichment process, lead powder was used for displacement, the ratio between the chlorination solution and the lead powder was 10:1 (Liter:gram), displacement temperature was 75° C., and the displacement time was 1 hour. The precious metal lean solution was cooled to room temperature and filtered to get lead chloride and lead lean solution, the lead lean solution was returned to the chlorination filtration process as part of the chlorination solution.

The recovery rate of bromine was 98.1%, the recovery rate of copper was 99.3%, the recovery rate of lead was 98.2%, the recovery rate of zinc was 99.1% and the recovery rate of precious metal was 99.5%.

Embodiment 6

Enrichment and recovery were performed according of the following steps:

The enrichment and recovery steps are as follows:

Mix the printed circuit board incineration ash and concentrated sulfuric acid with a mass concentration of 98% for slurry aging, the mass ratio between the printed circuit board incineration ash and the 98% concentrated sulfuric acid was 1.5:1, slurry was obtained after aging for 12 hours. The slurry was roasted at 270° C. and 1 hour to get primary roasted sand and primary roasted smoke. Secondary roasted sand and secondary roasted smoke were obtained through secondary roasting of the primary roasted sand, the roasting temperature was 550° C. and roasting time was 0.5 hours. Primary roasting and secondary roasting were carried out in the same roasting process. The secondary roasted sand was enriched by water leaching enrichment to get a water leaching slag rich in precious metals and a water leaching solution. Tap water was used as leaching solution in the process of water leaching, and lead powder was added to the water. The ratio between water and the secondary roasted sand was 5:1 (Liter:Kilogram), the ratio between the water and the lead powder is 1:3 (Liter:Gram), the leaching temperature was 65° C., and the leaching time was 1 hour. Zinc powder was used to displace copper in the leaching solution to obtain precipitated crude copper and post copper precipitation solution, the molar ratio of the zinc powder to copper in the leaching solution was 1.5:1. Evaporate the post copper precipitation solution to precipitate the zinc to get crude zinc sulfate crystalline and post zinc precipitation solution, the post zinc precipitation solution was returned to the water leaching process as part of the leaching solution. The primary roasted smoke from primary roasting was sprayed with sodium hydroxide solution with a mass percentage of 30% to get alkali washing solution and a flue gas, the flue gas was emptied into atmosphere. Alkali washing filtrate and alkali washing residue were obtained by filtration of the alkali washing solution, the alkali washing residue was returned to the subsequent cycle of chlorination enrichment process as part of chlorination raw materials. A bromine salt and a post bromine precipitation solution were obtained through partial evaporation of the alkali washing filtrate, the post bromine precipitation solution was returned to alkali washing/spraying. Perform dust collection and desulfurization on the secondary roasted smoke to obtain dust ash and a flue gas, empty the flue gas into the atmosphere, the dust ash was returned to the subsequent cycle of chlorination enrichment process as part of chlorination raw materials. Chlorination slag and chlorination solution were obtained by chlorination filtration of the chlorination raw materials that include the water leaching slag, the alkali washing residue and the dust ash. The chlorination slag was collected and combined for centralized processing, a mixture of calcium chloride, sodium chloride and 30% hydrochloric acid were used as chlorination solution, the concentration of calcium chloride in the chlorination solution was 50 g/L, the concentration of sodium chloride in the chlorination solution was 300 g/L, the concentration of 30% hydrochloric acid in the chlorination solution was 200 g/L, the ratio between chlorination solution and chlorination raw material (the water leaching slag, the alkali washing residue and the dust ash) was 10:1 (Liter:Kilogram), chlorination temperature was 65° C., and the chlorination time was 1-4 hours; during the chlorination process, 80 g sodium chlorate is added per liter of the leaching solution. Precious metal slag and precious metal lean solution were obtained by displacement enrichment of the chlorination solution; the precious metal slag was rich in precious metal was used to separate/extract the precious metal; in the displacement enrichment process, lead powder was used for displacement, the ratio between the chlorination solution and the lead powder was 5:1 (Liter:gram), displacement temperature was 85° C., and the displacement time was 0.5 hours. The precious metal lean solution was cooled to room temperature and filtered to get lead chloride and lead lean solution, the lead lean solution was returned to the chlorination filtration process as part of the chlorination solution.

The recovery rate of bromine was 97.9%, the recovery rate of copper was 98.7%, the recovery rate of lead was 98.8%, the recovery rate of zinc was 99.1% and the recovery rate of precious metal was 99.6%.

Embodiment 7

Enrichment and recovery were performed according of the following steps:

The enrichment and recovery steps are as follows:

Mix the printed circuit board incineration ash and concentrated sulfuric acid with a mass concentration of 98% for slurry aging, the mass ratio between the printed circuit board incineration ash and the 98% concentrated sulfuric acid was 0.8:1, slurry was obtained after aging for 20 hours. The slurry was roasted at 230° C. and 1.5 hours to get primary roasted sand and primary roasted smoke. Secondary roasted sand and secondary roasted smoke were obtained through secondary roasting of the primary roasted sand, the roasting temperature was 450° C. and roasting time was 1.5 hours. Primary roasting and secondary roasting were carried out in the same roasting process. The secondary roasted sand was enriched by water leaching enrichment to get a water leaching slag rich in precious metals and a water leaching solution. Tap water was used as leaching solution in the process of water leaching, and lead powder was added to the water. The ratio between water and the secondary roasted sand was 3.5:1 (Liter:Kilogram), the ratio between the water and the lead powder is 1:7 (Liter:Gram), the leaching temperature was 60° C., and the leaching time was 1.5 hours. Zinc powder was used to displace copper in the leaching solution to obtain precipitated crude copper and post copper precipitation solution, the molar ratio of the zinc powder to copper in the leaching solution was 1.4:1. Evaporate the post copper precipitation solution to precipitate the zinc to get crude zinc sulfate crystalline and post zinc precipitation solution, the post zinc precipitation solution was returned to the water leaching process as part of the leaching solution. The primary roasted smoke from primary roasting was sprayed with sodium hydroxide solution with a mass percentage of 30% to get alkali washing solution and a flue gas, the flue gas was emptied into atmosphere. Alkali washing filtrate and alkali washing residue were obtained by filtration of the alkali washing solution, the alkali washing residue was returned to the subsequent cycle of chlorination enrichment process as part of chlorination raw materials. A bromine salt and a post bromine precipitation solution were obtained through partial evaporation of the alkali washing filtrate, the post bromine precipitation solution was returned to alkali washing/spraying. Perform dust collection and desulfurization on the secondary roasted smoke to obtain dust ash and a flue gas, empty the flue gas into the atmosphere, the dust ash was returned to the subsequent cycle of chlorination enrichment process as part of chlorination raw materials. Chlorination slag and chlorination solution were obtained by chlorination filtration of the chlorination raw materials that include the water leaching slag, the alkali washing residue and the dust ash. The chlorination slag was collected and combined for centralized processing, a mixture of calcium chloride, sodium chloride and 30% hydrochloric acid were used as chlorination solution, the concentration of calcium chloride in the chlorination solution was 60 g/L, the concentration of sodium chloride in the chlorination solution was 240 g/L, the concentration of 30% hydrochloric acid in the chlorination solution was 350 g/L, the ratio between chlorination solution and chlorination raw material (the water leaching slag, the alkali washing residue and the dust ash) was 4:1 (Liter:Kilogram), chlorination temperature was 90° C., and the chlorination time was 2 hours; during the chlorination process, 65 g sodium chlorate is added per liter of the leaching solution. Precious metal slag and precious metal lean solution were obtained by displacement enrichment of the chlorination solution; the precious metal slag was rich in precious metal was used to separate/extract the precious metal; in the displacement enrichment process, lead powder was used for displacement, the ratio between the chlorination solution and the lead powder was 15:1 (Liter:gram), displacement temperature was 70° C., and the displacement time was 1.5 hours. The precious metal lean solution was cooled to room temperature and filtered to get lead chloride and lead lean solution, the lead lean solution was returned to the chlorination filtration process as part of the chlorination solution.

The recovery rate of bromine was 98.7%, the recovery rate of copper was 99.1%, the recovery rate of lead was 98.7%, the recovery rate of zinc was 99.2% and the recovery rate of precious metal was 99.3%.

Embodiment 8

Enrichment and recovery were performed according of the following steps:

The enrichment and recovery steps are as follows:

Mix the printed circuit board incineration ash and concentrated sulfuric acid with a mass concentration of 98% for slurry aging, the mass ratio between the printed circuit board incineration ash and the 98% concentrated sulfuric acid was 1.1:1, slurry was obtained after aging for 16 hours. The slurry was roasted at 210° C. and 2.5 hours to get primary roasted sand and primary roasted smoke. Secondary roasted sand and secondary roasted smoke were obtained through secondary roasting of the primary roasted sand, the roasting temperature was 520° C. and roasting time was 1.5 hours. Primary roasting and secondary roasting were carried out in the same roasting process. The secondary roasted sand was enriched by water leaching enrichment to get a water leaching slag rich in precious metals and a water leaching solution. Tap water was used as leaching solution in the process of water leaching, and lead powder was added to the water. The ratio between water and the secondary roasted sand was 4.5:1 (Liter:Kilogram), the ratio between the water and the lead powder is 1:7 (Liter:Gram), the leaching temperature was 48° C., and the leaching time was 2 hours. Zinc powder was used to displace copper in the leaching solution to obtain precipitated crude copper and post copper precipitation solution, the molar ratio of the zinc powder to copper in the leaching solution was 1.35:1. Evaporate the post copper precipitation solution to precipitate the zinc to get crude zinc sulfate crystalline and post zinc precipitation solution, the post zinc precipitation solution was returned to the water leaching process as part of the leaching solution. The primary roasted smoke from primary roasting was sprayed with sodium hydroxide solution with a mass percentage of 30% to get alkali washing solution and a flue gas, the flue gas was emptied into atmosphere. Alkali washing filtrate and alkali washing residue were obtained by filtration of the alkali washing solution, the alkali washing residue was returned to the subsequent cycle of chlorination enrichment process as part of chlorination raw materials. A bromine salt and a post bromine precipitation solution were obtained through partial evaporation of the alkali washing filtrate, the post bromine precipitation solution was returned to alkali washing/spraying. Perform dust collection and desulfurization on the secondary roasted smoke to obtain dust ash and a flue gas, empty the flue gas into the atmosphere, the dust ash was returned to the subsequent cycle of chlorination enrichment process as part of chlorination raw materials. Chlorination slag and chlorination solution were obtained by chlorination filtration of the chlorination raw materials that include the water leaching slag, the alkali washing residue and the dust ash. The chlorination slag was collected and combined for centralized processing, a mixture of calcium chloride, sodium chloride and 30% hydrochloric acid were used as chlorination solution, the concentration of calcium chloride in the chlorination solution was 95 g/L, the concentration of sodium chloride in the chlorination solution was 220 g/L, the concentration of 30% hydrochloric acid in the chlorination solution was 320 g/L, the ratio between chlorination solution and chlorination raw material (the water leaching slag, the alkali washing residue and the dust ash) was 4.5:1 (Liter:Kilogram), chlorination temperature was 72° C., and the chlorination time was 3.5 hours; during the chlorination process, 45 g sodium chlorate is added per liter of the leaching solution. Precious metal slag and precious metal lean solution were obtained by displacement enrichment of the chlorination solution; the precious metal slag was rich in precious metal was used to separate/extract the precious metal; in the displacement enrichment process, lead powder was used for displacement, the ratio between the chlorination solution and the lead powder was 12:1 (Liter:gram), displacement temperature was 67° C., and the displacement time was 1 hour. The precious metal lean solution was cooled to room temperature and filtered to get lead chloride and lead lean solution, the lead lean solution was returned to the chlorination filtration process as part of the chlorination solution.

The recovery rate of bromine was 99.0%, the recovery rate of copper was 99.5%, the recovery rate of lead was 98.5%, the recovery rate of zinc was 98.8% and the recovery rate of precious metal was 99.5%.

Embodiment 9

Enrichment and recovery were performed according of the following steps:

The enrichment and recovery steps are as follows:

Mix the printed circuit board incineration ash and concentrated sulfuric acid with a mass concentration of 98% for slurry aging, the mass ratio between the printed circuit board incineration ash and the 98% concentrated sulfuric acid was 0.8:1, slurry was obtained after aging for 24 hours. The slurry was roasted at 245° C. and 1 hour to get primary roasted sand and primary roasted smoke. Secondary roasted sand and secondary roasted smoke were obtained through secondary roasting of the primary roasted sand, the roasting temperature was 500° C. and roasting time was 1 hour. Primary roasting and secondary roasting were carried out in the same roasting process. The secondary roasted sand was enriched by water leaching enrichment to get a water leaching slag rich in precious metals and a water leaching solution. Tap water was used as leaching solution in the process of water leaching, and lead powder was added to the water. The ratio between water and the secondary roasted sand was 3.5:1 (Liter:Kilogram), the ratio between the water and the lead powder is 1:6.5 (Liter:Gram), the leaching temperature was 52° C., and the leaching time was 2 hours. Zinc powder was used to displace copper in the leaching solution to obtain precipitated crude copper and post copper precipitation solution, the molar ratio of the zinc powder to copper in the leaching solution was 1.25:1. Evaporate the post copper precipitation solution to precipitate the zinc to get crude zinc sulfate crystalline and post zinc precipitation solution, the post zinc precipitation solution was returned to the water leaching process as part of the leaching solution. The primary roasted smoke from primary roasting was sprayed with sodium hydroxide solution with a mass percentage of 30% to get alkali washing solution and a flue gas, the flue gas was emptied into atmosphere. Alkali washing filtrate and alkali washing residue were obtained by filtration of the alkali washing solution, the alkali washing residue was returned to the subsequent cycle of chlorination enrichment process as part of chlorination raw materials. A bromine salt and a post bromine precipitation solution were obtained through partial evaporation of the alkali washing filtrate, the post bromine precipitation solution was returned to alkali washing/spraying. Perform dust collection and desulfurization on the secondary roasted smoke to obtain dust ash and a flue gas, empty the flue gas into the atmosphere, the dust ash was returned to the subsequent cycle of chlorination enrichment process as part of chlorination raw materials. Chlorination slag and chlorination solution were obtained by chlorination filtration of the chlorination raw materials that include the water leaching slag, the alkali washing residue and the dust ash. The chlorination slag was collected and combined for centralized processing, a mixture of calcium chloride, sodium chloride and 30% hydrochloric acid were used as chlorination solution, the concentration of calcium chloride in the chlorination solution was 95 g/L, the concentration of sodium chloride in the chlorination solution was 300 g/L, the concentration of 30% hydrochloric acid in the chlorination solution was 400 g/L, the ratio between chlorination solution and chlorination raw material (the water leaching slag, the alkali washing residue and the dust ash) was 4.5:1 (Liter:Kilogram), chlorination temperature was 95° C., and the chlorination time was 3 hours; during the chlorination process, 72 g sodium chlorate is added per liter of the leaching solution. Precious metal slag and precious metal lean solution were obtained by displacement enrichment of the chlorination solution; the precious metal slag was rich in precious metal was used to separate/extract the precious metal; in the displacement enrichment process, lead powder was used for displacement, the ratio between the chlorination solution and the lead powder was 18:1 (Liter:gram), displacement temperature was 65° C., and the displacement time was 1.5 hours. The precious metal lean solution was cooled to room temperature and filtered to get lead chloride and lead lean solution, the lead lean solution was returned to the chlorination filtration process as part of the chlorination solution.

The recovery rate of bromine was 97.2%, the recovery rate of copper was 98.1%, the recovery rate of lead was 98.7%, the recovery rate of zinc was 99.3% and the recovery rate of precious metal was 99.4%.

Embodiment 10

Enrichment and recovery were performed according of the following steps:

The enrichment and recovery steps are as follows:

Mix the printed circuit board incineration ash and concentrated sulfuric acid with a mass concentration of 98% for slurry aging, the mass ratio between the printed circuit board incineration ash and the 98% concentrated sulfuric acid was 1.25:1, slurry was obtained after aging for 12 hours. The slurry was roasted at 215° C. and 1.5 hours to get primary roasted sand and primary roasted smoke. Secondary roasted sand and secondary roasted smoke were obtained through secondary roasting of the primary roasted sand, the roasting temperature was 515° C. and roasting time was 1.5 hours. Primary roasting and secondary roasting were carried out in the same roasting process. The secondary roasted sand was enriched by water leaching enrichment to get a water leaching slag rich in precious metals and a water leaching solution. Tap water was used as leaching solution in the process of water leaching, and lead powder was added to the water. The ratio between water and the secondary roasted sand was 4:1 (Liter:Kilogram), the ratio between the water and the lead powder is 1:7 (Liter:Gram), the leaching temperature was 52° C., and the leaching time was 1.5 hours. Zinc powder was used to displace copper in the leaching solution to obtain precipitated crude copper and post copper precipitation solution, the molar ratio of the zinc powder to copper in the leaching solution was 1.3:1. Evaporate the post copper precipitation solution to precipitate the zinc to get crude zinc sulfate crystalline and post zinc precipitation solution, the post zinc precipitation solution was returned to the water leaching process as part of the leaching solution. The primary roasted smoke from primary roasting was sprayed with sodium hydroxide solution with a mass percentage of 30% to get alkali washing solution and a flue gas, the flue gas was emptied into atmosphere. Alkali washing filtrate and alkali washing residue were obtained by filtration of the alkali washing solution, the alkali washing residue was returned to the subsequent cycle of chlorination enrichment process as part of chlorination raw materials. A bromine salt and a post bromine precipitation solution were obtained through partial evaporation of the alkali washing filtrate, the post bromine precipitation solution was returned to alkali washing/spraying. Perform dust collection and desulfurization on the secondary roasted smoke to obtain dust ash and a flue gas, empty the flue gas into the atmosphere, the dust ash was returned to the subsequent cycle of chlorination enrichment process as part of chlorination raw materials. Chlorination slag and chlorination solution were obtained by chlorination filtration of the chlorination raw materials that include the water leaching slag, the alkali washing residue and the dust ash. The chlorination slag was collected and combined for centralized processing, a mixture of calcium chloride, sodium chloride and 30% hydrochloric acid were used as chlorination solution, the concentration of calcium chloride in the chlorination solution was 70 g/L, the concentration of sodium chloride in the chlorination solution was 280 g/L, the concentration of 30% hydrochloric acid in the chlorination solution was 280 g/L, the ratio between chlorination solution and chlorination raw material (the water leaching slag, the alkali washing residue and the dust ash) was 5:1 (Liter:Kilogram), chlorination temperature was 90° C., and the chlorination time was 2.5 hours; during the chlorination process, 45 g sodium chlorate is added per liter of the leaching solution. Precious metal slag and precious metal lean solution were obtained by displacement enrichment of the chlorination solution; the precious metal slag was rich in precious metal was used to separate/extract the precious metal; in the displacement enrichment process, lead powder was used for displacement, the ratio between the chlorination solution and the lead powder was 9:1 (Liter:gram), displacement temperature was 70° C., and the displacement time was 1 hour. The precious metal lean solution was cooled to room temperature and filtered to get lead chloride and lead lean solution, the lead lean solution was returned to the chlorination filtration process as part of the chlorination solution.

The recovery rate of bromine was 97.9%, the recovery rate of copper was 99.0%, the recovery rate of lead was 98.7%, the recovery rate of zinc was 97.5% and the recovery rate of precious metal was 99.1%.

What is claimed is:

1. A method for enriching precious metals from printed circuit board incineration ash by bath smelting-chlorination circulation process, comprising the steps of:
    (1) pretreating a printed circuit board incineration ash, further comprising the steps of:
        performing slurry aging to obtain a slurry by mixing the printed circuit board incineration ash with concentrated sulfuric acid with a mass concentration of 98%, the mass ratio between the printed circuit board incineration ash and the 98% concentrated sulfuric acid being 0.5-1.5:1, the aging time being 12-24 hours;
        performing primary roasting to obtain a primary roasted sand and a primary roasted smoke, by roasting the slurry;
        performing secondary roasting to obtain a secondary roasted sand and a secondary roasted smoke by roasting the primary roasted sand;
        performing water leaching enrichment to obtain a water leaching slag rich in precious metals and a water leaching solution, by leaching the secondary roasted sand with an initial water leaching solution comprising water;
        performing displacement precipitation of copper to obtain a crude copper and a post copper precipitation solution, by adding zinc powder to the water leaching solution to displace and precipitate copper from the water leaching solution, wherein the molar ratio of the zinc powder to copper in leaching solution is in the range of 1.2:1-1.5:1;
        evaporating the post copper precipitation solution to precipitate the zinc to obtain crude zinc sulfate crystalline and a post zinc precipitation solution, and adding the post zinc precipitation solution to the initial water leaching solution in the water leaching enrichment process;
        performing comprehensive treatment of the primary roasted smoke obtained via the primary roasting, further comprising the steps of:
            alkali washing by spraying the primary roasted smoke with sodium hydroxide solution with a mass percentage of 30% to obtain an alkali washing solution and a flue gas;
            releasing the flue gas;
            filtrating the alkali washing solution to obtain an alkali washing filtrate and an alkali washing residue;
            partially evaporating the alkali washing filtrate to precipitate and obtain a bromine salt and to obtain a post bromine precipitation solution; and
            returning the post bromine precipitation solution to the alkali washing solution; and
        performing comprehensive treatment of the secondary roasted smoke obtained via the secondary roasting, further comprising the steps of:
            performing dust collection and desulfurization on the secondary roasted smoke to obtain a dust ash and another flue gas; and
            releasing the another flue gas; and
    (2) enriching precious metals by a circulating chlorination process, further comprising:
        collecting chlorination raw materials comprising the water leaching slag, the alkali washing residue, and the dust ash from the step (1);
        performing chlorination and filtration of the chlorination raw materials to obtain a chlorination slag and a chlorination solution;
        obtaining a precious metal slag and a precious metal lean solution by displacement enrichment of the chlorination solution;
        extracting the precious metal from the precious metal slag;
        filtering the precious metal lean solution to obtain lead chloride and a lead lean solution; and
        returning the lead lean solution into the step of chlorination and filtration of the chlorination raw materials to be part of the chlorination solution.

2. A method according to claim 1, wherein the primary roasting step is performed at a roasting temperature range of 200-270° C. and a roasting time range of 1-3 hours.

3. A method according to claim 1, wherein the secondary roasting step is performed at a roasting temperature range of 400-550° C. and a roasting time range of 0.5-2 hours; wherein the primary roasting and secondary roasting are carried out in the same roasting process; wherein the water leaching solution comprises tap water and lead powder, and wherein the ratio between water and the secondary roasted sand is in the range of 3:1 to 5:1 (Liter:Kilogram), the ratio between the water and the lead powder is in the range of 1:3 to 1:10 (Liter:Gram), and the leaching temperature is in the range of 45-65° C., and the leaching time is in the range of 1-2 hours.

4. A method according to claim 1, wherein in the chlorination and filtration step of chlorination enrichment process, the chlorination solution further comprises calcium chloride, sodium chloride and 30% hydrochloric acid, wherein the concentration of calcium chloride in the chlorination solution is in the range of 50-100 g/L, the concentration of sodium chloride in the chlorination solution is in the range of 200-300 g/L, the concentration of 30% hydrochloric acid in the chlorination solution is in the range of 200-400 g/L, the ratio between the chlorination solution and the chlorination raw materials is 3:1-10:1 Liter:Kilogram, wherein the chlorination temperature is in the range of 65-95° C., and the chlorination time is in the range of 1-4 hours; and wherein during the chlorination process, 35-80 grams sodium chlorate is added per liter of the leaching solution.

5. A method according to claim 1, wherein in the displacement enrichment, lead powder is used for displacement, the ratio between the chlorination solution and lead powder is 5:1-20:1 L:g, displacement temperature is 65-85° C., and time of the displacement is 0.5-2 hours.

6. A method according to claim 1, wherein the post bromine precipitation solution is used in the alkali washing.

* * * * *